(12) United States Patent
Nagasaka et al.

(10) Patent No.: US 8,382,864 B2
(45) Date of Patent: Feb. 26, 2013

(54) HYDROGEN-GENERATING APPARATUS AND FUEL CELL SYSTEM

(75) Inventors: Keisuke Nagasaka, Susono (JP); Naoki Ito, Yokohama (JP); Satoshi Iguchi, Mishima (JP); Satoshi Aoyama, Susono (JP); Hiroshi Aoki, Nagoya (JP); Takashi Shimazu, Nagoya (JP); Hiroyuki Mitsui, Nagoya (JP)

(73) Assignees: Toyota Jidosha Kabushiki Kaisha, Toyota-shi (JP); Kabushiki Kaisha Toyota Chuo Kenkyusho, Aichi-gun (JP)

( * ) Notice: Subject to any disclaimer, the term of this patent is extended or adjusted under 35 U.S.C. 154(b) by 978 days.

(21) Appl. No.: 11/883,163

(22) PCT Filed: Mar. 8, 2006

(86) PCT No.: PCT/JP2006/305069
§ 371 (c)(1),
(2), (4) Date: Jul. 27, 2007

(87) PCT Pub. No.: WO2006/095910
PCT Pub. Date: Sep. 14, 2006

(65) Prior Publication Data
US 2008/0145726 A1 Jun. 19, 2008

(30) Foreign Application Priority Data
Mar. 8, 2005 (JP) ................... 2005-064608

(51) Int. Cl.
*B01J 8/00* (2006.01)
(52) U.S. Cl. .................... 48/61; 422/625; 429/416

(58) Field of Classification Search ........... 48/61–118.5, 48/197 R–197 A, 127.1, 127.9; 422/129–242; 429/400–535
See application file for complete search history.

(56) References Cited

U.S. PATENT DOCUMENTS

| | | | |
|---|---|---|---|
| 3,982,962 A | 9/1976 | Bloomfield | |
| 4,240,805 A | 12/1980 | Sederquist | |
| 4,686,157 A * | 8/1987 | Miyake et al. | 429/416 |
| 2002/0031458 A1 | 3/2002 | Hirata | |
| 2003/0059668 A1 * | 3/2003 | Visco et al. | 429/44 |
| 2003/0235529 A1 | 12/2003 | Hershkowitz et al. | |
| 2004/0023101 A1 * | 2/2004 | Jacobson et al. | 429/38 |
| 2004/0043277 A1 | 3/2004 | Ito et al. | |
| 2004/0170558 A1 | 9/2004 | Hershkowitz et al. | |

(Continued)

FOREIGN PATENT DOCUMENTS

| | | |
|---|---|---|
| EP | 1 394 884 A2 | 3/2004 |
| JP | A 2003-151599 | 5/2003 |

(Continued)

OTHER PUBLICATIONS

Berlowitz, et al; (2004); "A Breakthrough Technology for Hydrogen Production"; Fuel Cell Seminar; pp. 232-235.

*Primary Examiner* — Imran Akram
(74) *Attorney, Agent, or Firm* — Oliff & Berridge, PLC

(57) ABSTRACT

The present invention provides a hydrogen-generating apparatus in which the reduction in reforming efficiency associated with an increase in switching frequency to the regeneration reaction can be suppressed, and generation of hydrogen by reforming can stably be performed. In the reforming reaction, a cathode offgas discharged from a hydrogen-separation-membrane fuel cell 30 having a hydrogen-permeating film is supplied to PSR reformers 10 and 20, in which the reforming reaction and the regeneration reaction are performed alternately.

11 Claims, 9 Drawing Sheets

U.S. PATENT DOCUMENTS

| | | |
|---|---|---|
| 2004/0170559 A1 | 9/2004 | Hershkowitz et al. |
| 2004/0175326 A1 | 9/2004 | Hershkowitz et al. |
| 2004/0241505 A1 | 12/2004 | Hershkowitz et al. |
| 2004/0244289 A1* | 12/2004 | Morozumi et al. ............... 48/77 |
| 2006/0134470 A1* | 6/2006 | Kaye et al. .................... 429/12 |
| 2007/0160884 A1* | 7/2007 | Aoyama et al. ................. 429/26 |

FOREIGN PATENT DOCUMENTS

| | | |
|---|---|---|
| JP | A 2003-335503 | 11/2003 |
| JP | A 2004-146337 | 5/2004 |

\* cited by examiner

HYDROGEN-GENERATING APPARATUS AND FUEL CELL SYSTEM

TECHNICAL FIELD

The present invention relates to a hydrogen-generating apparatus in which a fuel-reforming reaction by using a catalyst and a regeneration reaction for regenerating the catalyst by heating are performed alternately by switching therebetween, and a fuel cell system equipped with the apparatus.

BACKGROUND ART

Conventional electric vehicles carry a fuel cell as a power supply for driving a vehicle and a fuel, which is hydrogen or a raw fuel for generating hydrogen, to operate the fuel cell to generate electricity.

When hydrogen itself is loaded on a vehicle, the hydrogen gas is compressed and charged into a high-pressure cylinder, or liquefied to be filled in a tank, or loaded on a vehicle by using a hydrogen-absorbing alloy or a hydrogen-adsorbing material. However, the high-pressure container has a relatively small capacity, resulting in a smaller hydrogen charging amount, even though it requires a greater wall thickness. A liquefying charging method using liquefied hydrogen is inevitably accompanied with vaporization loss, and demands greater energy for liquefaction of the hydrogen gas. The hydrogen-absorbing alloy or hydrogen adsorbing material does not have a sufficiently high hydrogen-storing density necessary for electric vehicles and the like, and control of absorption and/or adsorption of hydrogen is also difficult. Although it is also possible to use a method of obtaining hydrogen by steam-reforming a raw fuel, the reforming reaction is an endothermic reaction, and therefore, additional heat source is required. Accordingly, it is not possible to improve the overall energy efficiency in a system employing an electric heater or the like as a heat source. Thus, it is necessary that a quantity of hydrogen can be stably secured under various environmental conditions.

A method of supplying hydrogen is yet to be technically established, and it is desired that such a hydrogen-supplying method be established, in light of the expected increase in utilization of hydrogen in various apparatuses in the future.

As technology relevant to the above, a fuel cell system having a reforming apparatus in which a steam-reforming reaction for a fuel by using a catalyst, which is an endothermic reaction, and a regeneration reaction of recovering the temperature of the catalyst reduced by the steam-reforming reaction, are alternatively switched therebetween has been proposed (e.g., see U.S. Patent Application Publication No. 2004-175326).

Other methods have been disclosed in connection with this technology (e.g., see U.S. Patent Application Publication Nos. 2003-235529, 2004-170558, and 2004-170559). In addition, a fuel cell using a hydrogen-permeable material has also been disclosed as an example of a fuel cell generating power in high temperature regions (e.g., Japanese Patent Application Laid-Open No. 2004-146337).

DISCLOSURE OF INVENTION

When a required amount of hydrogen is large, it is necessary to increase an amount of hydrogen reformed by conducting the reforming reaction continuously. However, since a steam-reforming reaction is an endothermic reaction, when the reforming reaction is carried out continuously, the temperature of a catalyst falls significantly, resulting in an increase in the frequency of switching to the regeneration reaction, from the reforming reaction, for returning the catalyst to the high temperature. In addition, the increase in switching frequency results in a greater consumption of hydrogen generated by the reforming, so that it is not possible to obtain hydrogen efficiently in the reforming apparatus. That is, technologies capable of controlling an increase or decrease in the quantity of the hydrogen generated by reforming while maintaining the thermal balance of the catalyst have not been proposed yet.

The present invention has been made in view of the above circumstances, and provides a hydrogen-generating apparatus that can prevent deterioration in reforming efficiency associated with the increase in the switching frequency to a regeneration reaction from a reforming reaction, irrespective of the required amount of hydrogen, and can stably generate reformed hydrogen, and a fuel cell system that has higher thermal utilization efficiency, and exerts stable power-generating performance, irrespective of variation in load.

The inventors have found that when a steam-reforming reaction for a fuel, which is an endothermic reaction, and a combustion reaction (hereinafter may refer to as a regeneration reaction) for regenerating a reforming reactivity on a catalyst surface by recovering the reduced temperature of the catalyst due to the steam-reforming reaction, are switched therebetween, it is useful to control the reaction balance between the steam-reforming reaction and the partial oxidation reaction during the steam-reforming reaction, and control of the catalyst temperature in accordance with an increase or decrease in a required amount of hydrogen associated with a variation in load or the like, in order to suitably control the thermal balance of the catalyst and the amount of increase or decrease in the amount of hydrogen to be generated, and thus the present invention has been completed based on these finding.

To achieve the object, in a first aspect of the invention, a hydrogen-generating apparatus comprises at least two reforming reactors, containing a catalyst, in which a reactant to be reformed is subjected to a reforming reaction on the heated catalyst when the reactant to be reformed is supplied, and a combustion fuel is subjected to a combustion reaction to heat the catalyst when the combustion fuel is supplied, and a supplying unit for supplying an oxygen-containing gas to at least one of the reforming reactors for the reforming reaction.

The hydrogen-generating apparatus according to the invention has at least two reforming reactors [hereinafter, referred to also as "PSR (pressure swing reforming) reformers"], in which a fuel-reforming reaction utilizing stored heat and a regeneration reaction recovering the quantity of stored heat (i.e., catalyst temperature) lowered due to the reforming reaction are alternately switched therebetween, and the fuel-reforming reaction is carried out in at least one reformer, and the regeneration reaction is carried out in the other at least one reformer (hereinafter, the hydrogen-generating apparatus may be referred to as a "PSR-reforming apparatus").

The reforming reactions according to the invention include the following steam-reforming reaction, which is an endothermic reaction, and the following partial oxidation reaction which is an exothermic reaction:

$$C_nH_{2n+2} + nH_2O \rightarrow (2n+1)H_2 + nCO \qquad (1)$$

$$C_nH_{2n+2} + (n/2)O_2 \rightarrow (n+1)H_2 + nCO \qquad (2)$$

For example, when a hydrogen-generating apparatus includes two reforming reactors, the reforming reaction, which is an endothermic reaction, is carried out in one reformer by using the stored heat therein, while the regeneration reaction which is an exothermic reaction is carried out in the other reformer; and, the reformer is switched to the regeneration reaction when the quantity of the heat stored in the one reformer decreases in the steam-reforming reaction (mainly, reaction (1)), and the other reformer is switched to the fuel-reforming reaction using the heat stored by the regeneration reaction. Such a configuration eliminates the need for an additional heating device or the like, and it is possible to continue hydrogen generation at a high heat-energy utilization efficiency by repeating the switching.

In a first aspect of the present invention, a steam-reforming reaction as well as a partial oxidation reaction are carried out by supplying an oxygen-containing gas to one of plural PSR reformers, in which the reforming reaction is performed, to increase the oxygen concentration in the reforming-reaction atmosphere. Accordingly, for example, when an amount of a reform product increases due to an increase in the amount of required hydrogen reforming product in the case that the variation range of load is large and the like, the catalyst temperature, i.e., the quantity of the heat stored, decreases significantly. The fuel cell system according to the invention can effectively prevent reduction in the hydrogen-generating speed due to the reduction in reaction temperature associated with the decrease in the quantity of stored heat, can maintain the required amount of hydrogen, and extend the length of the switching cycle from the reforming reaction to the regeneration reaction.

In such a case, it is desirable to increase an amount of the reactant to be reformed, because the hydrogen-generating efficiency is reduced when the ratio of the partial oxidation reaction is increased.

In the present invention, as the reactant to be reformed, which is subjected to a reforming reaction in a PSR reformer, a fuel is appropriately selected from hydrocarbon fuels generally used for obtaining synthetic gases containing hydrogen and carbon monoxide (in particular, hydrogen) by a reforming reaction, such as steam reforming (for example, methane gas and gasoline).

The fuel cell system in a second aspect of the present invention comprises the hydrogen-generating apparatus recited in the first aspect of the present invention, and the hydrogen-generating apparatus comprises at least two reforming reactors containing a catalyst in which a reactant to be reformed, is subjected to a reforming reaction on the heated catalyst when the reactant to be reformed is supplied, and a combustion fuel is subjected to a combustion reaction to heat the catalyst when the combustion fuel is supplied, and a supplying unit for supplying an oxygen-containing gas to at least one of the reforming reactors in which the reforming reaction is performed, and a fuel cell which generates electricity by supplying the reformed hydrogen-containing gas generated in the hydrogen-generating apparatus, wherein the supplying unit which constitutes the hydrogen-generating apparatus supplies a cathode offgas discharged from the fuel cell directly to at least one reforming reactor in which the reforming reaction is performed, so that an oxygen-containing gas is supplied to the reforming reactor.

Since the cathode offgas discharged from the fuel cell has a relatively higher temperature, water and residual oxygen contained in the cathode offgas can efficiently be utilized by supplying the discharged cathode offgas directly into the reforming reactor in which the reforming reaction is performed, and, by the utilization of exhaust heat, can prevent a drastic decrease in the quantity of the heat stored, namely, can prevent reduction of the temperature of the catalyst owing to the endothermic steam-reforming reaction, and can stably generate electric power irrespective of load fluctuations. The residual oxygen is used in the partial oxidation reaction, while water is used in the steam-reforming reaction.

Accordingly, as compared with conventional fuel cell systems in which the cathode offgas is supplied to a reforming reactor as a reactant for the steam reforming reaction after separate recovery of water in the cathode offgas, the fuel cell system according to the present invention can utilize the exhaust heat in the cathode offgas and effectively improve the efficiency of utilization of heat in the overall system, owing to no need for vaporization of water by heating with, for example, an additional heater when recovered water is supplied for reforming.

In the second aspect of the present invention, it is effective to use a fuel cell employing an electrolyte having an electrolyte layer formed on at least one face of a hydrogen-permeable metal layer. Such a fuel cell employing an electrolyte having an electrolyte layer formed on at least one face of a hydrogen-permeable metal layer has an operating temperature range from 300 to 600° C., which is almost the same as the reaction temperature range at which the reforming reaction proceeds; and thus, the constitution of the system in which the cathode offgas of the fuel-cell is introduced into the PSR reformer is effective for preventing drastic fall of the catalyst temperature associated with the endothermic steam-reforming reaction. It also eliminates the need for preheating the gas before the gas introduction and thus, the system is particularly suitable from the perspective of effective use of thermal energy.

It can be configured such that a steam-reforming reaction and a partial oxidation reaction can be carried out in at least one reactor of plural reforming reactors in which the reforming reaction is performed. When the fuel cell is changed from power-generating operation under low load to that under high load (in transition), it is desirable to control the temperature conditions during the reforming reaction to within a suitable range by installing a reaction-controlling unit, so that the ratio of the partial oxidation reaction in the reforming reactor, i.e., the ratio, "a" ($<1$), of the partial oxidation reaction with respect to 1 of the steam-reforming reaction under high load, becomes greater than the ratio, "b" ($<1$), of the partial oxidation reaction with respect to 1 of the steam-reforming reaction under low load, that is, "a">"b".

In the transition period from a low-load state to a high-load state, the required amount of hydrogen in the fuel cell increases significantly, and the amount of steam in the cathode offgas cannot keep up with the increase in the required amount of steam by the PSR reformer, resulting in a delay in supplying cathode offgas and a further decrease in the quantity of the heat storage, i.e., reduction of catalyst temperature. The partial oxidation reaction is an exothermic reaction which does not require steam, and it is possible to prevent a drastic reduction in the quantity of the stored heat, and maintain a high temperature of the catalyst to some extent, and thus, to maintain the amount of hydrogen generated by reforming irrespective of variation of load, by increasing the proportion of partial oxidation reaction conducted in the steam-reforming reaction. Further, it is possible to prevent the generation of soot by increasing the amount of oxygen present in the atmosphere. Thus, it is possible to conduct stable power-generating operation continuously.

In order to increase the ratio of the partial oxidation reaction, it is preferable to use a method of increasing an amount of oxygen to be supplied to the cathode-side face of the fuel cell or feeding the open air or the cooling air, which is used for cooling the fuel cell, from a separately formed feed path into the reforming reactor in which the reforming reaction is performed. It is desirable to increase an amount of the reactant to be reformed, because an increase in the ratio of the partial oxidation reaction results in a decrease in hydrogen-generating efficiency.

The fuel cell system in the second aspect of the present invention may have a cooling unit with a cooling medium such as air or water, and it is also effective to supply the cathode offgas as well as the cooling medium discharged from the cooling unit into at least one of plural reforming reactors in which the reforming reaction is performed. In such a manner, the reforming reaction can be accelerated, and the amount of oxygen necessary for the partial oxidation reaction can be maintained when it is performed.

In addition, the fuel cell system in the second aspect of the present invention preferably has a reaction-controlling unit for controlling the reactions so that the condition of the above mentioned a>b is satisfied and controlling the reactions to make the switching cycle for high load between the reforming reaction and the combustion reaction in each reforming reactor shorter than that for low load, when the power generation of the fuel cell is changed from low to high (transition period).

As described above, the quantity of the stored heat (catalyst temperature) often falls significantly in the transition period, and thus, it is possible to shorten the endothermic reforming period, prevent drastic reduction in the quantity of the stored heat, and to some extent maintain the temperature of the catalyst high, by making the switching cycle for high load from reforming reaction to regeneration reaction shorter than that for low load. As a result, it is possible to conduct the power-generating operation stably irrespective of the variation in load.

The reforming reaction is carried out by using the heat stored in the reformer, the generated reformed hydrogen is supplied to the fuel cell. The reduction of the heat stored in the reformer by the steam reforming of the fuel can be recovered in the exothermic combustion reaction. By doing so the invention provides a system which can maintain the fuel reforming efficiency and can perform stable continuous power-generating irrespective of fuel cell load change from low to high.

BEST MODE FOR CARRYING OUT THE INVENTION

Hereinafter, an embodiment of the fuel cell system according to the present invention will be described in detail with reference to FIGS. 1 to 9, and details of the hydrogen-generating apparatus according to the invention will be specifically described.

The fuel cell system in the embodiment is a system having a hydrogen-generating apparatus according to the present invention that is designed to be installed in an electric vehicle equipped with a hydrogen-separation-membrane fuel cell (HMFC) employing a proton-conductive ceramic film layered on the surface of a hydrogen-permeable metal membrane as its electrolyte film, in which power is generated while the hydrogen generated by reforming in the hydrogen-generating apparatus is supplied to the hydrogen-separation-membrane fuel cell as the fuel for the power generation.

The hydrogen-generating apparatus will be mainly described in the case, for example, when gasoline or a mixed gas of gasoline and steam is used as a reactant to be reformed in the reforming reaction (reactant to be reformed) and an anode offgas in a fuel-cell (and gasoline, hydrogen, and the like as occasion demands), is used as the combustion fuel to be combusted in the combustion (regeneration) reaction. However, the invention is not limited to the following embodiment.

Figure 1:
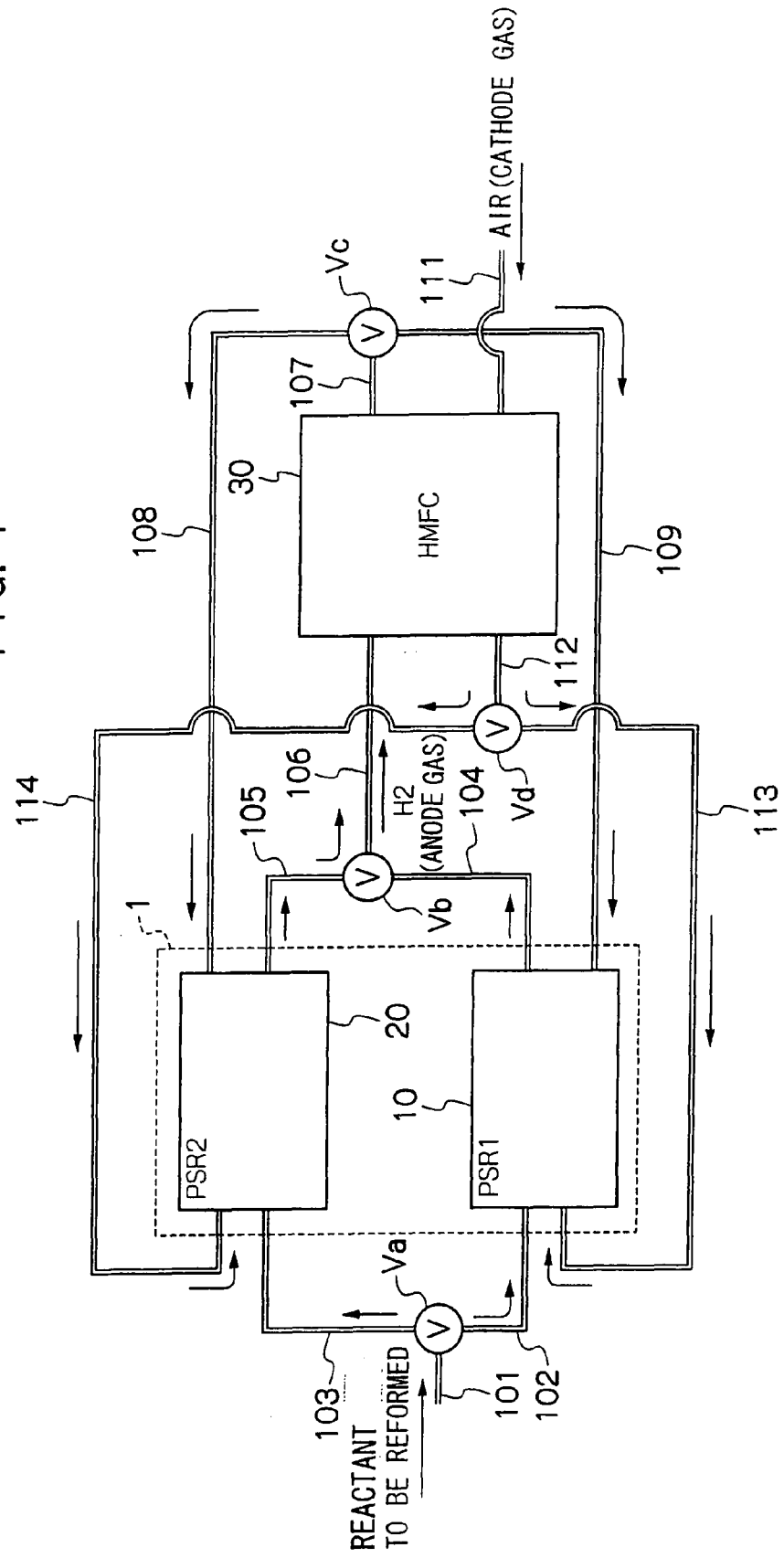
FIG. 1 is a schematic constitutive diagram showing the fuel cell system in an embodiment of the present invention.

As shown in FIG. 1, the fuel cell in the embodiment has a PSR-reforming apparatus 1 including a first PSR reformer (PSR1) 10 and a second PSR reformer (PSR2) 20 each of which has a catalyst and an injection device that allows alternate switching between a reforming reaction and a regeneration reaction, and a hydrogen-separation-membrane fuel cell (HMFC) 30 for generating electric power by the use of hydrogen generated by reforming in respective PSR reformers.

The alternate switching between the reforming and regeneration reactions in the first PSR reformer 10 and the second PSR reformer 20 is performed by switching a flow channel for supplying gasoline or a mixed gas of gasoline and steam (reactant to be reformed) to the PSR reformers, a flow channel for supplying an anode offgas to the PSR reformers, a flow channel for discharging a hydrogen-rich gas generated by reforming (hydrogen-containing gas) from the PSR reformer and the like by the use of a plurality of switching unit, and more specifically, by switching the plurality of valves by being controlled by a control unit.

The basic configuration of the fuel cell system in the embodiment will be first described briefly with reference to FIG. 1. FIG. 1 is a schematic diagram for explaining the configuration of the fuel cell system.

A supply pipe 101 supplying gasoline or a mixed gas of gasoline and steam (reactant to be reformed) and a pipe 102 or 103, via a valve Va, are connected to an end of each of the first PSR reformer 10 or the second PSR reformer 20, and the reactant to be reformed is supplied to each PSR reformer by switching of the valve Va.

An discharge pipe 104 or 105 for discharging the hydrogen-rich gas generated by steam-reforming of gasoline in reforming reaction is connected to the other end of PSR reformer 10 or PSR reformer 20 via a switching valve Vb, and a hydrogen-supplying pipe 106 communicates with a hydrogen-separation-membrane fuel cell (hereinafter, referred to simply as "fuel cell") 30 via the valve Vb so that hydrogen as a fuel for power generation, is supplied to the fuel cell 30 continuously by switching of the valve Vb. A hydrogen tank for temporary storage of hydrogen (e.g., a hydrogen storage device, a high-pressure tank, or the like) may be disposed at the hydrogen-supplying pipe 106, for controlling the amount of the hydrogen to be supplied to the fuel cell 30 or for supplying a supplemental fuel for power generation when the quantity of the heat stored in the PSR reformer becomes low, for example, when the cell is actuated.

A discharge pipe 107 discharging the anode offgas from the hydrogen-separation-membrane fuel cell 30, and a supply pipe 108 or 109 for supplying the discharged anode offgas into each PSR reformer is connected via a valve Vc, to the other end of each of the PSR reformer 10 and the PSR reformer 20. The anode offgas, which is a combustion fuel, is supplied to the PSR reformers, in which the regeneration reaction is performed, by switching of the valve Vc.

The respective end of the hydrogen-supplying pipe 106 and the discharge pipe 107 are connected to the hydrogen-separation-membrane, fuel cell 30 and additionally, an air-supplying pipe 111 supplying a high-oxygen-content air (oxidant) for power-generating operation and an discharge pipe 112 discharging the cathode offgas generated in the cell reaction are connected to the hydrogen-separation-membrane fuel cell 30. And the fuel cell operates when the hydrogen generated by reforming and air are supplied to the fuel cell 30, and the offgas after power generation (including anode and cathode offgases) is discharged from the cell to the outside.

One end of each of supply pipes 113 and 114 for supplying the cathode offgas to the PSR reformers 10 and 20 is respectively connected to a valve Vd that is connected to the other end of the discharge pipe 112, and the cathode offgas is supplied to the PSR reformer, in which the reforming reaction is performed, by switching the valve Vd. The cathode offgas is an oxygen source and part of the reactant to be reformed which are subjected to the partial oxidation reaction during the reforming reaction.

For example, when the regeneration reaction is performed in the PSR reformer 10 and the reforming reaction is performed in the PSR reformer 20, the valve Vd is switched to allow the discharge pipe 112 to communicate with the supply pipe 114, and the valves Va to Vc respectively are switched to allow the communication of the supply pipe 101 with the pipe 103, the discharge pipe 105 with the hydrogen-supplying pipe 106, and the discharge pipe 107 with the supply pipe 109; and the cathode offgas discharged from fuel cell 30 is used for the reforming reaction, together with a mixed gas of gasoline and steam (reactant to be reformed) and the anode offgas from the fuel cell 30 is used as a combustion fuel in the regeneration reaction.

When the quantity of the stored heat in the PSR reformer 20 for reforming reaction decreases, a reforming reaction can be performed in the PSR reformer 10 and a regeneration reaction can be performed in the PSR reformer 20, by switching respective valves once again. The PSR reformer 10, in which the regeneration reaction can be performed, is then in a state in which the quantity of the stored heat is increased so as to be able to perform the reforming reaction. In such a case, the discharge pipe 112 and the supply pipe 113 are communicated with each other by switching the valve Vd, and the supply pipe 101 and the pipe 102 are communicated with each other, discharge pipe 104 and the hydrogen-supplying pipe 106 are communicated with each other, and the discharge pipe 107 and the supply pipe 108 are communicated with each other, by switching the valves Va to Vc, respectively.

The fuel cell system in the embodiment will be described in more detail with reference to FIG. 2, mainly as an example in which the reforming reaction is performed in the PSR reformer 10 and the regeneration reaction is performed in the PSR reformer 20.

An injection device 13 for injecting a reactant to be reformed, gasoline or a mixed gas of gasoline and steam, and an injection device 14, for injecting a cathode offgas from the hydrogen-separation-membrane fuel cell (HMFC) 30, are connected to one end of the first PSR reformer (PSR1) 10. The injection device 13 is connected to one end of the supply pipe 102 supplying gasoline as a fuel, which constitutes a reactant to be reformed, (and steam or a mixed gas of gasoline and steam, as occasion demands), and the injection device 14 is connected to one end of the supply pipe 113 for supplying the cathode offgas. The reactant to be reformed (gasoline or a mixed gas of gasoline and steam) supplied through the supply pipe 102 is injected from the injection device 13 at a wide angle, and the cathode offgas supplied through the supply pipe 113 is injected from the injection device 14 at a wide angle, so that the reactant to be reformed or the gas is allowed react on the catalyst placed in the PSR reformer 10.

One end of the discharge pipe 104, for discharging a hydrogen-rich gas generated in the steam-reforming reaction, is connected to the other end of the PSR reformer 10; and the other end of the pipe 104 is connected to the hydrogen-separation-membrane fuel cell 30 so that hydrogen as a fuel for power generation, can be supplied thereto. One end of a discharge pipe 107 is connected to the hydrogen-separation-membrane fuel cell 30; one end of a supply pipe 108, having a valve V2, is connected to the other end of the discharge pipe 107 so that the hydrogen-separation-membrane fuel cell 30 is communicated with the PSR reformer 20, via the discharge pipe 107 and the supply pipe 108. The anode offgas discharged from the hydrogen-separation-membrane fuel cell 30 is supplied to the PSR reformer 20, via the discharge pipe 107 and the supply pipe 108.

Further, one end of a fuel-supplying pipe 120, having a valve V6, is connected to an intermediate point of the supply pipe 108 so that the addition amount of gasoline or hydrogen gas as a combustion fuel for use in the regeneration reaction in addition to the anode offgas can be controlled. One end of a bypass pipe 116, having a valve V4, is connected to an intermediate point of the discharge pipe 104, so that the increase or decrease in the fuel amount can be adjusted by controlling the rate of flow by the valve V4. Accordingly, when the amount of hydrogen (combustion fuel) supplied from the supply pipe 108 is smaller, for example when the power generation is switched rapidly from low-load to high-load operation so that the quantity of hydrogen required for the fuel cell 30 increases, or when switching between the reforming and regeneration is performed frequently in a short period of time, the utilization factor of the anode offgas by supplying hydrogen from outside or part of the generated reformed hydrogen to the PSR reformer 20, in which the regeneration reaction is performed, is controlled, and the quantity of increase or decrease of the combustion fuel used in the regeneration reaction can be controlled over a wide range. In this manner, it is possible to accelerate the heat accumulation in the PSR reformer 20, in which the regeneration reaction is performed, and shorten the switching cycle between the reforming and regeneration reactions.

In addition, the feed rate to the PSR reformer 20 may be controlled so as not to vary in response to the operation state of power generation, by providing a throttle valve for adjusting the rate of the anode-offgas flow according to the degree of opening of the valve, or a hydrogen buffer tank (e.g., a hydrogen absorbing device or a high-pressure tank) in the supply pipe 108, and by adjusting the degree of the opening of the throttle valve or supplying hydrogen from the hydrogen buffer tank.

One end of an discharge pipe 109 connected to a combustor (not shown) is connected to the valve V2 and one end of a return pipe 110 communicating with the discharge pipe 104 is connected to the valve V2. If hydrogen (anode offgas) is supplied in excess of an amount required for the regeneration reaction from the supply pipe 108 to the PSR reformer 20, it is possible to control the variation of the amount of hydrogen and others (combustion fuel) used, by cleaning the offgas in the combustor to discharge the cleaned gas out of the other end of the discharge pipe 109 to outside when the supply pipe 108 communicates with the discharge pipe 109 through the valve V2. When the supply pipe 108 communicates with the return pipe 110 through valve V2, the anode offgas is returned into the hydrogen-supplying pipe 106 and the gas is used for fuel for power generation.

Alternatively, the excessive hydrogen may be stored in a hydrogen storage tank, which is separately provided and absorbs the hydrogen, and an amount of hydrogen (combustion fuel) to be supplied can be controlled by supplying the hydrogen therefrom to the PSR reformer 20 as occasion demands.

One end of an air-supplying pipe 111 for supplying a high-oxygen-content air (oxidant gas) for the power-generating operation and one end of an discharge pipe 112 for discharging the cathode offgas generated in cell reaction are additionally connected to the hydrogen-separation-membrane fuel cell 30, and the fuel cell 30 communicates with the PSR reformer 10 via a supply pipe 113 and the valve V1.

Further, one end of a supply pipe 119 is connected additionally to the valve V1, and the fuel cell 30 communicates with the PSR reformer 20 via the supply pipe 119 and the discharge pipe 112. It is also possible to control the amount of the air (combustion-assisting air) for combustion of hydrogen or the like (combustion fuel) in the anode offgas supplied to the PSR reformer 20, adjust the oxygen amount therein in a desirable range, and regulate the temperature by supplying the cathode offgas at a relatively high temperature.

A cooling pipe 115 having a valve V3 introducing cooling air (cooling medium) introduced from the atmosphere through one end of the pipe 115 is disposed within the hydrogen-separation-membrane fuel cell 30, and the interior of the cell is cooled by heat exchange with the cooling air in the cooling pipe. The other end of the cooling pipe 115 is connected to the PSR reformer 20, and it is possible to supply the cooling air, which is heated by the use for cooling, directly into the PSR reformer 20, maintain the temperature in the reformer, control the rate of flow, and use the air as combustion-assisting air for combusting the combustion fuel such as hydrogen or the like in the anode offgas in the regeneration reaction. Such a configuration is also effective for shortening the switching cycle between the reforming and regeneration reactions.

Further, the feed rate of the cooling air to the PSR reformer 20 can be controlled so as not to vary in response to the operation state of the power-generation, and the amount of the oxygen can be adjusted within a desirable range, by providing a throttle valve for controlling the amount of cooling air according to the degree of opening of the valve, or a buffer tank (e.g., an oxygen adsorption apparatus or a high-pressure tank) in the cooling pipe 115 to operate the throttle valve or to supply air from the buffer tank.

Injection devices 23, 24, 25, and 26 are connected to one face of the PSR reformer 20, and configured so that the gases can be injected at a wide angle onto the catalyst contained in the PSR reformer 20.

The injection device 23 is connected to the other end of the supply pipe 108, and the injection device 24 is connected to the other end of the condenser pipe 115. The injection device 25 is connected to the other end of the supply pipe 119, and a portion of the cathode offgas can be additionally supplied into the PSR reformer 20 as the combustion-assisting air. The injection device 26 is also connected to the other end of the bypass pipe 116, and a portion of the hydrogen-rich gas generated by reforming can be additionally supplied into the PSR reformer 20 as a combustion fuel.

One end of the return pipe 117, having a valve V5 for recycling the gas from the internal atmosphere after the regeneration reaction, and one end of the outside discharge pipe 118 for discharging the gas from the internal atmosphere after the regeneration reaction are connected to the other face of the PSR reformer 20. The other end of the return pipe 117 is connected to an intermediate point in the supply pipe 108 to form a circulation system, so that the interior of the PSR reformer 20 can be maintained at a high temperature by feeding the high-temperature gas after the regeneration reaction back into the PSR reformer 20.

Figure 3:
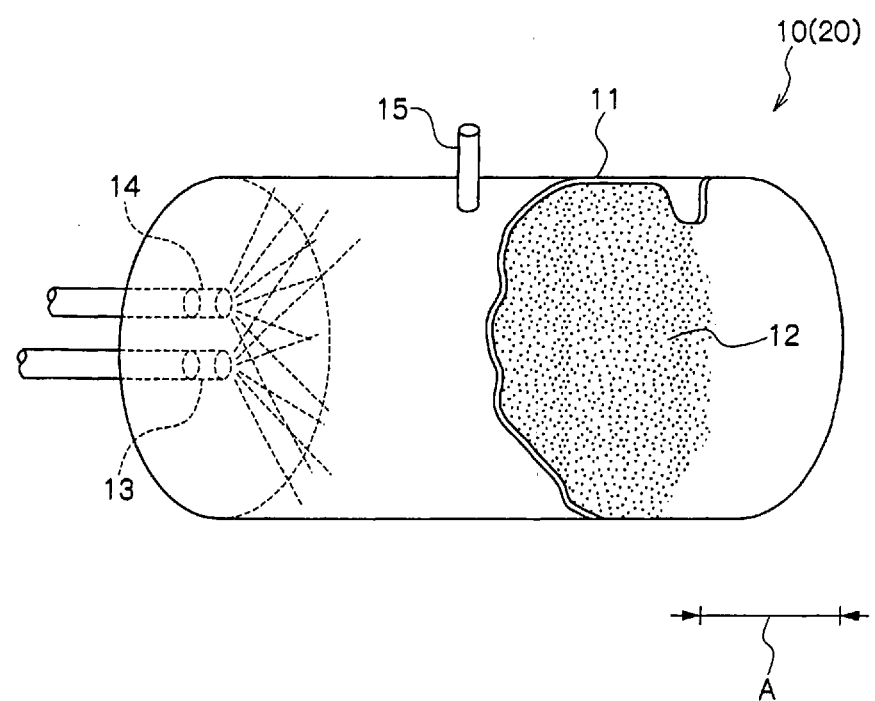
FIG. 3 is a perspective view illustrating the PSR reformer in an embodiment of the present invention.

As shown in FIG. 3, the first PSR reformer 10 includes a cylindrical container 11 having a circular cross-section, both the ends of which are closed off and a catalyst (catalyst-holding section) 12 held at the inner surface of the cylindrical container 11, and the cylindrical container 11 forms a space for carrying out reactions and functions as a catalyst holding member.

The cylindrical container 11 is formed in a hollow cylindrical shape with honeycomb-shaped ceramic having a circular cross-section of 10 cm in width, and both the end surfaces thereof in the longitudinal direction are closed off. The cross-sectional shape and the size of the container can be arbitrarily determined, and any shape, for example, circular, rectangular or oval shape, or any size may be selected freely depending on the purpose or the like.

Figure 2:
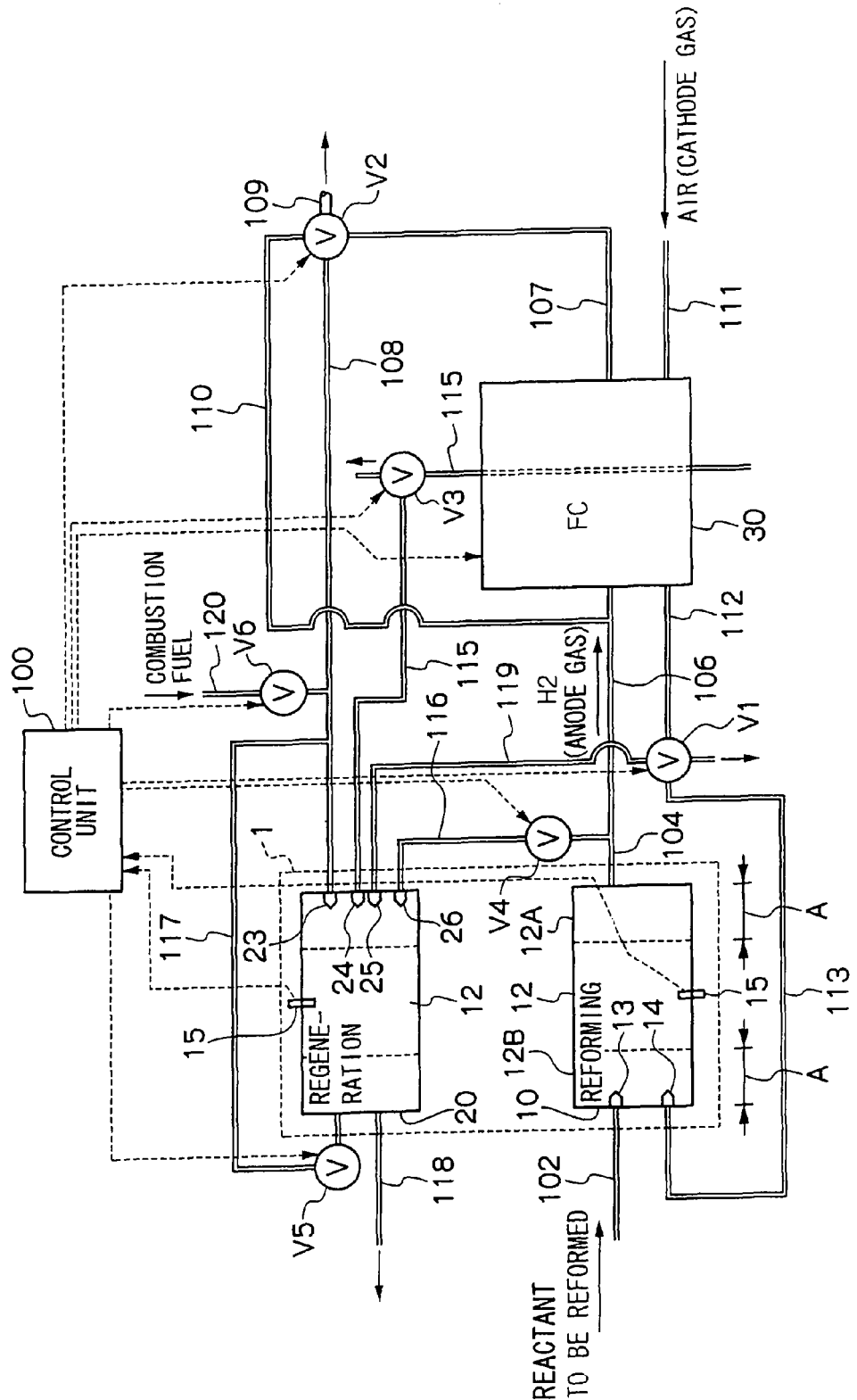
FIG. 2 is a schematic diagram specifically showing the constitution of part of the fuel cell system in an embodiment of the present invention.

The catalyst 12 is held only on the inner curved surface of the central section in the longitudinal direction of the cylindrical container namely, the catalyst 12 is held on all surfaces excluding the non-catalyst-holding sections, 12A and 12B, of length "A" from both ends in the longitudinal directions, within the cylindrical container where no catalyst is held (see FIG. 2). Examples of catalysts 12 for use include metals such as Pd, Ni, Pt, Rh, Ag, Ce, Cu, La, Mo, Mg, Sn, Ti, Y, and Zn, and the like.

If the reforming reaction is performed on the catalyst 12, the hydrogen-rich gas generated by reforming is cooled in the non-catalyst-holding section 12A at the downstream side in the gas discharge direction and can be supplied at a temperature close to the operation temperature of the fuel cell. In contrast, when the reforming reaction is switched to the regeneration reaction, the non-catalyst-holding section 12A has already been in an elevated temperature by heat exchange with the hydrogen-rich gas, and thus, the combustion fuel fed in the direction opposite to the flow of the hydrogen-rich gas is preheated in the non-catalyst-holding section 12A and supplied to the catalyst 12. Thus, it is possible to obtain a temperature distribution in which the stored heat in the central section which holds the catalyst 12 in the cylindrical container 11 increases the closer to the center, which is advantageous from the perspective of reactivity.

A temperature sensor 15 for measuring the temperature of the catalyst is placed on the inner curved surface of the cylindrical container 11, and controls the reaction according to the catalyst temperature.

The structure of the second PSR reformer 20 is similar to that of the first PSR reformer 10, and the reforming and regeneration reactions in the second PSR reformer 20 are switched therebetween, in relation to the reaction carried out in the first PSR reformer 10 (whether the reaction is a reforming reaction or a regeneration reaction).

Figure 4:
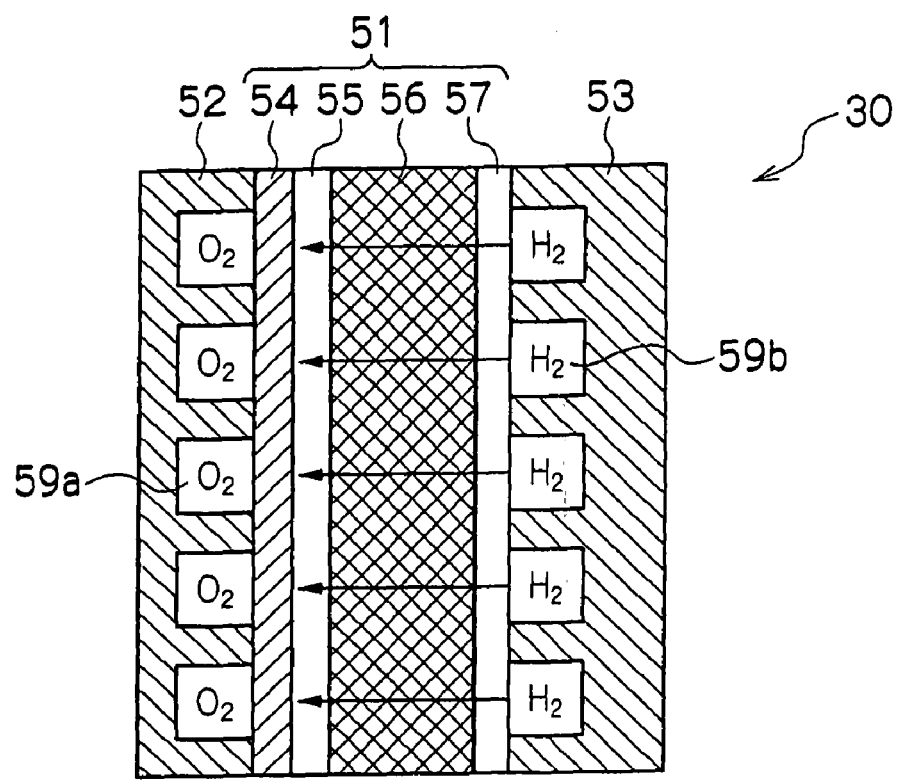
FIG. 4 is a schematic cross-sectional view of the hydrogen-separation-membrane fuel cell (HMFC) in an embodiment of the present invention.

As shown in FIG. 4, the hydrogen-separation-membrane fuel cell (HMFC) 30 includes an electrolyte film 51, having a dense hydrogen-permeable layer formed of a hydrogen-permeable metal, and an oxygen electrode ($O_2$ electrode) 52 and a hydrogen electrode ($H_2$ electrode) 53 holding the electrolyte film 51 therebetween, in which hydrogen is selectively permeated to generate electricity when the hydrogen-rich gas generated by reforming in the PSR reformer 10 is supplied to the fuel cell 30.

Air flow channels 59a for passing air as an oxidant gas, that is, supplying and discharging air, are formed between the oxygen electrode 52 and the electrolyte film 51. Fuel channels 59b for passing a hydrogen-rich fuel gas (hydrogen-rich gas generated by reforming), that is, supplying and discharging the hydrogen-rich fuel gas, are formed between the hydrogen electrode 53 and the electrolyte film 51. The oxygen electrode 52 and the hydrogen electrode 53 can be prepared from various materials such as carbon (for example, carbon powder carrying platinum or an alloy composed of platinum and another metal) and electrolytic solution (for example, NAFION Solution, manufactured by Aldrich Chemical).

The electrolyte film 51 has a four-layer structure including a dense base material of vanadium (V) (dense hydrogen-permeable layer of a hydrogen-permeable metal) 56. Palladium (Pd) layers (dense hydrogen-permeable layers formed of a hydrogen-permeable material) 55 and 57 are formed so as to sandwich both the surfaces of the base material 56, and further, a thin electrolyte layer 54 of $BaCeO_3$ (solid oxide) is formed on the opposite surface of the Pd layer 55 to the surface in contact with the base material 56.

Other than vanadium, the base material 56 may be prepared from niobium, or tantalum, or an alloy containing at least one of niobium, tantalum, in addition to vanadium (V), because such a base material is highly hydrogen-permeable and relatively inexpensive.

The electrolyte layer ($BaCeO_3$ layer) 54 may be prepared from $BaCeO_3$, a $SrCeO_3$-based ceramic proton conductor, or the like.

Examples of the hydrogen-permeable metals include, in addition to palladium, vanadium, niobium, tantalum, and alloys containing at least one of these elements, palladium alloys, and the like. By providing a dense layer containing these materials the electrolyte layer can be protected.

The dense layer (film) formed of a hydrogen-permeable metal at the oxygen electrode side, preferably contains, for example, vanadium (pure vanadium, an alloy of vanadium and nickel, or the like), niobium, tantalum, or an alloy containing at least one of these materials, because these materials have generally a high hydrogen permeability and a low cost. These materials may be applied to the hydrogen electrode as the dense layer, but are preferably applied to the oxygen electrode side for prevention of hydrogen embrittlement. For example, use of palladium or a palladium alloy is preferable for the dense layer on the hydrogen-electrode side, from the viewpoint of relatively high hydrogen permeability and resistance to hydrogen embrittlement.

Figure 8:
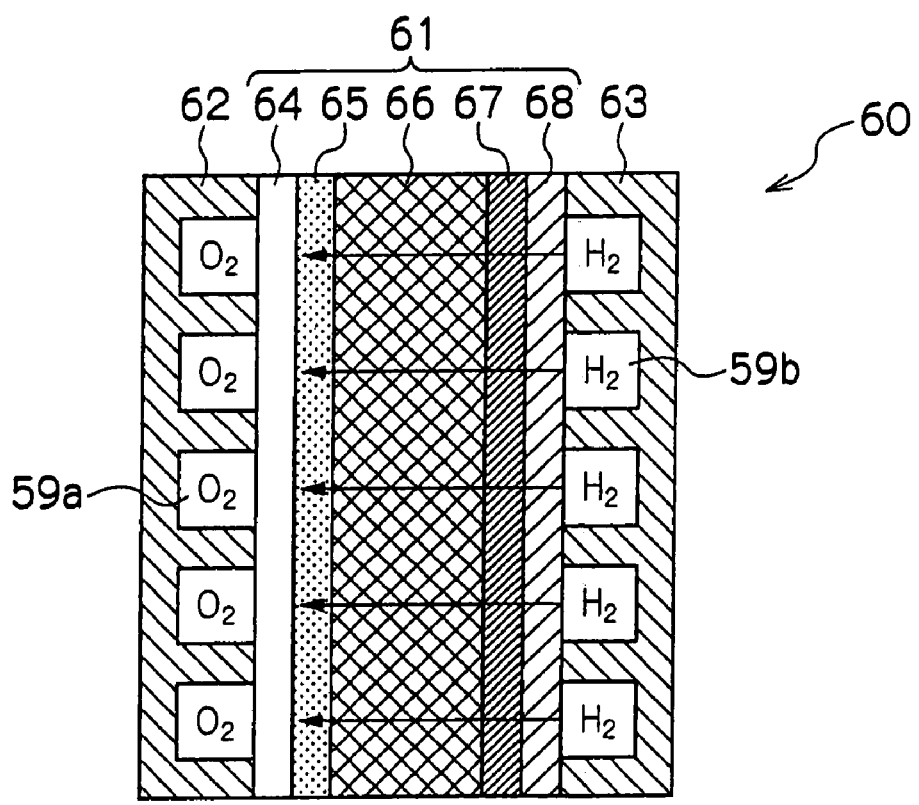
FIG. 8 is a schematic cross-sectional view illustrating another typical example of the fuel cell in the fuel cell system in an embodiment of the present invention.
Figure 9:
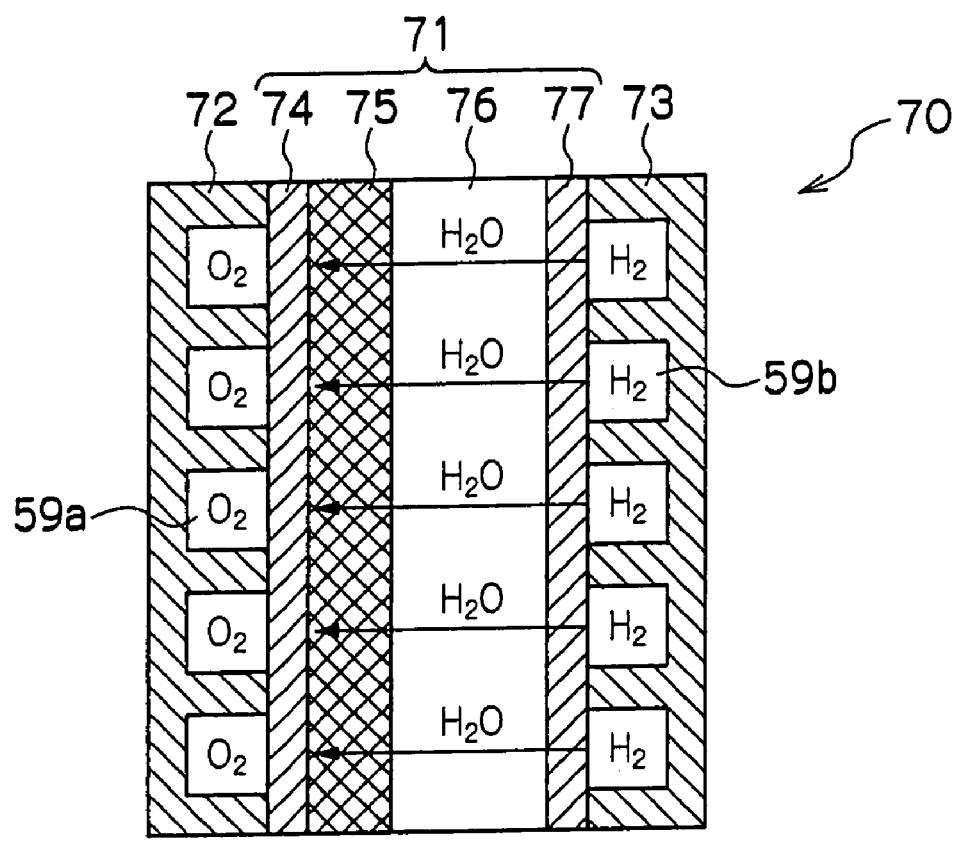
FIG. 9 is a schematic cross-sectional view illustrating yet another example of the fuel cell in the fuel cell system in an embodiment of the present invention.

As shown in FIG. 4, if the fuel cell has a sandwiched three-layer structure composed of Pd layer 55/base material 56/Pd layer 57, i.e., a laminated structure of two or more layers composed of different metals (dense layers of hydrogen-permeable materials), a metal diffusion-preventing layer for preventing diffusion of metal form one metal layer to another metal layer may be formed at at least a part of the interface between the layers formed of different metals from each other (e.g., see FIGS. 8 and 9). The metal diffusion-preventing layer is described in Japanese Patent Application Laid-Open No. 2004-146337, paragraph Nos. [0015] to [0016].

As described above, the sandwiched structure may be formed as a layered structure of palladium (Pd)/vanadium (V)/Pd or as a five-layer structure of Pd/tantalum (Ta)N/Ta/Pd, or the like. As described above, V has a faster permeability of protons or hydrogen atoms and a lower cost than those of Pd, but lower capabilities of dissociating a hydrogen molecule into protons, and thus, it is possible to raise the permeability by providing Pd layer or Pd layers having a higher capability of dissociating hydrogen molecules to protons on one surface or both surfaces of the V layer. In such a case, it is possible to prevent mutual diffusion between the different metals and prevent reduction in hydrogen permeability and the electromotive force of the fuel cell, by forming a metal diffusion-preventing layer between the metal layers.

The electrolyte layer 54 is made of a solid oxide, and a reaction-preventing layer for preventing the reaction between the oxygen atoms in the electrolyte layer and Pd may be formed at at least a part of the interface between the electrolyte layer 54 and the Pd layer 55 (e.g., see the reaction-preventing layer 65 in FIG. 8). The reaction-preventing layer is described in Japanese Patent Application Laid-Open No. 2004-146337, paragraph Nos. [0024] to [0025].

By the structure of the electrolyte film 51, formed by a base vanadium material of a dense hydrogen-permeable material and an inorganic electrolyte layer formed on the cathode side surface of the fuel cell, the electrolyte film 51 can be made thinner, and the operation temperature of high temperature-operation type solid oxide fuel cells (SOFC) can be lowered to a temperature range of 300 to 600° C. Thus, the fuel cell system according to the invention is suitably structured, in which the cathode offgas discharged from the fuel cell is directly supplied into the PSR reformer for the reforming reaction.

In the hydrogen-separation-membrane fuel cell 30, electric power is outputted to the outside from the cell by the electrochemical reactions (cell reactions) represented by the following Formulae (1) to (3) when a hydrogen-rich gas having a high hydrogen ($H_2$) concentration is supplied to the fuel channels 59b and oxygen ($O_2$)-containing air is supplied in the air channels 59a. Formulae (1) and (2) represent the reactions in the anode and cathode sides, respectively, and Formula (3) represents the overall reaction in the fuel cell.

$$H_2 \rightarrow 2H^+ + 2e^- \tag{1}$$

$$(\tfrac{1}{2})O_2 + 2H^+ + 2e^- \rightarrow H_2O \tag{2}$$

$$H_2 + (\tfrac{1}{2})O_2 \rightarrow H_2O \tag{3}$$

The PSR reformers 10 and 20 (PSR-reforming apparatuses), hydrogen-separation-membrane fuel cell (HMFC) 30, valves V1 to V6, injection devices 13 and 14, injection devices 23, 24, 25, an 26, temperature sensor 15, and the like are electrically connected to a control unit 100, and the operational timings thereof are controlled by the control unit 100. The control unit 100 performs the control of normal power-generating operation of the fuel cell, in which the output by regulating the amounts of hydrogen gas and air is controlled depending on the level of the load (not shown) connected to hydrogen-separation-membrane fuel cell, and also the reactions between the reforming reaction and the regeneration reaction in the PSR-reforming apparatuses are controlled (including reaction control when variation in load during the power-generating operation of fuel cell arises).

In this embodiment, when the PSR reformer 10 is switched from the regeneration reaction to the reforming reaction and the PSR reformer 20 is switched from the reforming reaction to the regeneration reaction, the quantity of the heat stored in the PSR reformer 10 increases, and when gasoline or a mixed gas of gasoline and steam (reactant to be reformed) are injected and supplied onto the catalyst from the injection device 13, the steam-reforming of the gasoline is performed on the catalyst, to generate a hydrogen-rich synthetic gas (hydrogen-rich gas), and further, the cathode offgas discharged from the fuel cell 30 is injected from the injection device 14. The cathode offgas mainly contains residual oxygen which has not been consumed in the cell reaction and water which has been generated in the cell reaction. At this stage, the fuel cell 30 is in the normal power-generating state, namely, in the state where air is supplied, and the discharge pipe 112 and the supply pipe 113 are communicated with each other via the valve V1. The reforming reaction is preferably carried out under a heat stored condition of 300 to 1,100° C.

Since the reforming reaction is an endothermic reaction, a tendency to decrease in the quantity of the stored heat (i.e., catalyst temperature) and a drastic drop in temperature arise when the reforming reaction is carried out continuously, resulting in reduction in the hydrogen generating property by reforming, but it is possible to compensate for the temperature drop by supplying the cathode offgas having a relatively high temperature and conducting the partial oxidizing reaction on the catalyst. Because the partial oxidation reaction is an exothermic reaction, it is possible to continue stabilized power-generating operation irrespective of variation in load, by performing the endothermic reforming reaction and the exothermic regeneration reaction at the same time.

When the ignition switch is turned on, if the quantity of the heat stored in the PSR reformer 10 is still small, for example, the fuel cell is actuated by supplying hydrogen stored in the hydrogen tank connected to the hydrogen-supplying pipe 106 and the discharged cathode offgas is supplied to the PSR reformer 10 so that the temperature of the reformer 10 is increased by the heat obtained and the partial oxidation reaction of the reactant to be reformed is gradually performed, thus, to increase the quantity of the heat stored and perform normal reforming reaction thereafter.

The hydrogen-rich gas thus generated by reforming is cooled in the non-catalyst-holding section 12A at the side of the PSR reformer 10 to which the discharge pipe 104 is connected, supplied via the discharge pipe 104 to the anode side of the hydrogen-separation-membrane fuel cell 30, consumed in the power-generating operation (cell reaction), discharged through the discharge pipe 107 as the anode offgas, and injected via the supply pipe 108 from the injection device 23. The anode offgas contains mainly residual hydrogen which has not been consumed in the cell reaction, CO, and $CH_4$. It is possible then to control the feed rate of the anode offgas into PSR reformer 20, by switching the valve V2 so as to communicate the supply pipe 108 with the return pipe 110 or discharge pipe 109.

The anode offgas, as well as a part of the fuel cell 30-cooling air and the cathode offgas for use as an oxygen source for combustion, are injected into the PSR reformer 20 from the injection devices 24 and 25, respectively, to combust the injected hydrogen on the catalyst, and thus, to increase the quantity of the heat stored, i.e., raising the catalyst temperature by combustion heating. The non-catalyst-holding section (12A), at the side of the PSR reformer 20 to which the anode offgas or the like are supplied, has been heated by the reforming reaction conducted before the regeneration reaction is performed similar to above, and is thus in the state where the heat can be used effectively, because the catalyst 12 is heated once again by heat exchange with the anode offgas or the like supplied during the regeneration reaction.

If the amount of combustion is small only with the anode offgas, the quantity of the stored heat is insufficient, or the heat storage cannot be performed in a short period, it is possible to increase or restore the quantity of the heat stored sufficiently and rapidly by combustion heating, by supplying a part of the hydrogen-rich gas generated by reforming from the injection device 26 connected to the bypass pipe 116 or gasoline and hydrogen gas via the fuel-supplying pipe 120 from outside as the combustion fuel.

The gas in the reformer after combustion is discharged through the discharge pipe 118 to the outside. Feed back of the gas in the reformer after combustion via the return pipe 117 into the supply pipe 108 leads to increase in the amount of the combustion-assisting air and the temperatures of the anode offgas and combustion-assisting air supplied into the injection device 23 are controlled.

Figure 5:
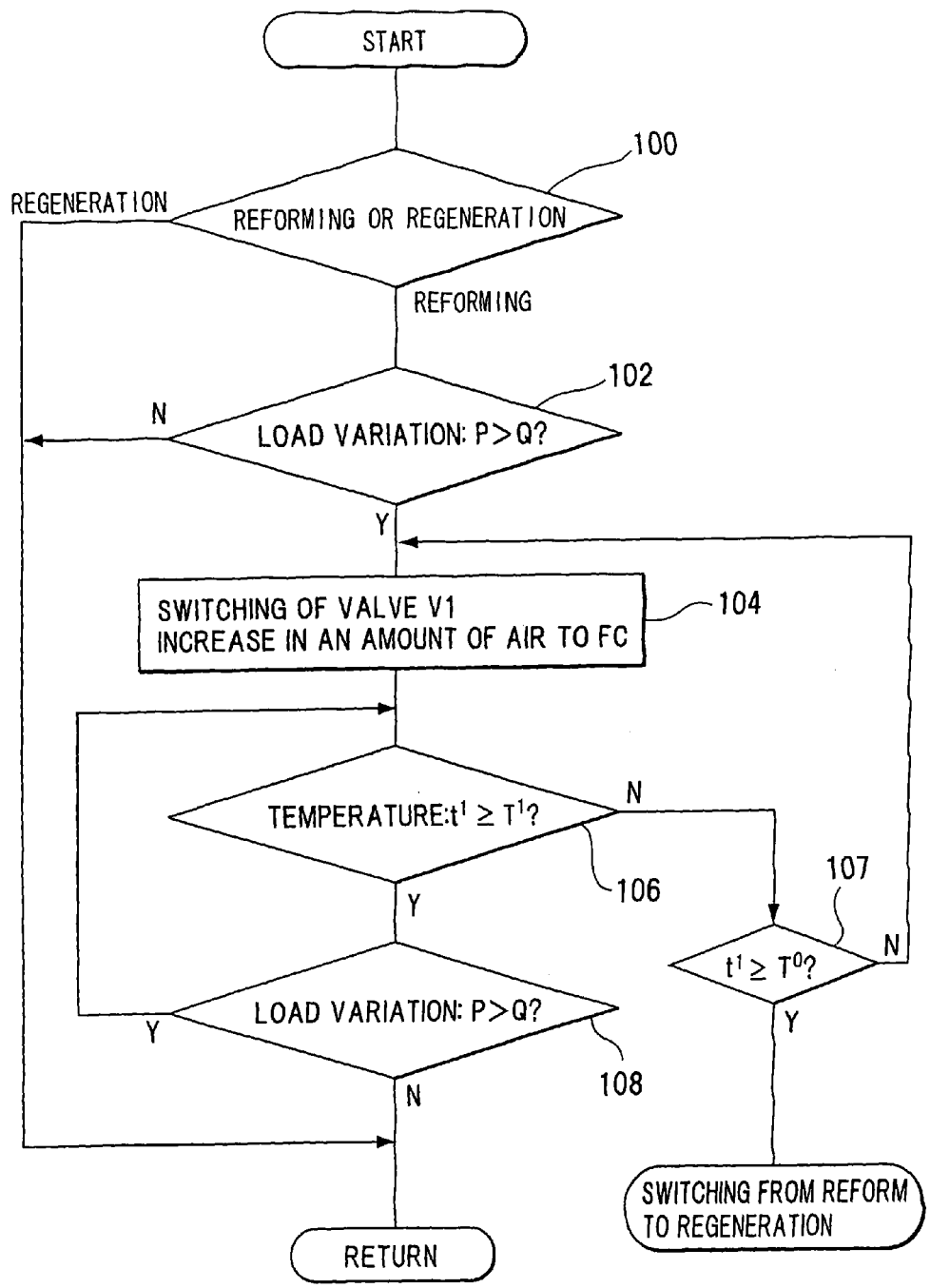
FIG. 5 is a flowchart showing the reaction rate-controlling routine executed in the transition period in the fuel cell system in an embodiment of the present invention.

Hereinafter, the control routine by the control unit 100 in the fuel cell system in the embodiment will be described with reference to FIGS. 5 to 7, and as an example, in particular a control routine for switch controlling the reforming and regeneration reactions when the operation of fuel cell 30 is changed from low load to high load will be explained.

First, when the fuel cell 30 is changed from power-generating operation under low load to that under high load (in transition period), the reaction rate control routine for controlling the reaction such that the ratio of the partial oxidation reaction to that of the reforming reaction under high load (ratio of the degree of progress of partial oxidation reaction to the degree of progress of reforming reaction) is greater than that under low load.

As described above, after the ignition switch is turned on, the fuel cell 30 comes into the normal power-generating operation and the normal reforming reaction proceeds in one of the PSR reformers 10 and 20 of the PSR-reforming apparatus 1 and normal regeneration reaction proceeds in the other, and the reforming and regeneration reactions are switched therebetween at a predetermined switching timing. The switching operations may be performed, for example, when the temperature of the catalyst in the PSR reformer in which the reforming reaction is being performed (reforming PSR reformer) becomes a temperature lower than the temperature at which the reforming can be performed, or when the period of time after the initiation of the reaction exceeds a predetermined switch-controlling period.

Specifically, as shown in FIG. 1, the discharge pipe 112 is communicated with the supply pipe 113, the pipe 102 is communicated with the PSR reformer 10, the discharge pipe 104 is communicated with the hydrogen-supplying pipe 106, and the discharge pipe 107 is communicated with the supply pipe 108, respectively. And, as shown in FIG. 2, when the reforming reaction is started in the PSR reformer 10 and the regeneration reaction is started in the PSR reformer 20, gasoline or a mixed gas of gasoline and steam (reactant to be reformed) is supplied from the injection device 13 onto the catalyst in the PSR reformer 10, and cathode offgas is supplied from the injection device 14, so that a hydrogen-rich gas is generated by the steam-reforming of the gasoline. The temperature of the catalyst 12 in the PSR reformer 10 is lowered as the steam-reforming reaction proceeds as shown in FIG. 1, when the temperature of the catalyst 12 detected by a temperature sensor 15 reaches a predetermined value (e.g., temperature at which the reforming can be performed) or less, the discharge pipe 112 is communicated with the PSR reformer 20 (supply pipe 114) by switching of a valve Vd (not shown in FIG. 2). The supply pipe 101, the hydrogen-supplying pipe 106, and the discharge pipe 107 are communicated with the PSR reformer 20 (pipe 103, discharge pipe 105, supply pipe 109) by switching of valves Va to Vc (not shown in FIG. 2), and the PSR reformer 10 is switched from the reforming reaction to the regeneration reaction, and the PSR reformer 20 from the regeneration reaction to the reforming reaction, respectively. Thereafter, when the temperature of the catalyst 12 is lowered due to continuous steam-reforming reaction in the PSR reformer 20, and when the detected temperature reaches a temperature equal to or lower than a predetermined value (for example, a temperature at which the reforming can be performed), the pipe configuration as shown in FIG. 2 is formed again, and the PSR reformer 10 is switched from the regeneration reaction to the reforming reaction and the PSR reformer 20 is switched from the reforming reaction to the regeneration reaction.

When the fuel cell 30 is changed from a power-generating operation under low load to that under high load (in transition) before the next switching period, a reaction rate-controlling routine so as to make the ratio of the partial oxidation reaction under high load greater than the partial oxidation reaction under low load is executed. FIG. 5 shows the reaction rate-controlling routine so as to make the ratio of the partial oxidation under high load greater than the ratio of the partial oxidation under low load.

When the routine is executed, it is judged whether the reaction in the PSR reformer 10 is a reforming reaction or a regeneration reaction in Step 100, and if the reaction is a reforming reaction, it is judged whether the fuel cell system is in the transition period in Step 102. On the other hand, if the reaction is judged to be a regeneration reaction in Step 100, the routine terminates, because it is not necessary to perform the partial oxidation reaction progressively.

In Step 102, it is judged whether the value of variation in load P (=t−s), when the system is in the transition period, i.e., when the fuel cell is changed from a low load state "s" to a high load state "t", is greater than a predetermined value Q, and, if the value of variation in load P is greater than the predetermined value Q, the opening of valve V1 is widened, and the quantity of the air (oxidant) supplied to the fuel cell (FC) 30 is increased in Step 104.

Thus, it is possible to increase the amount of discharge of the cathode offgas, increase the feed rate of the cathode offgas supplied from the injection device 14, and raise the oxygen-containing ratio in the cathode offgas when there is no variation in load. The oxygen concentration in the PSR reformer can be made higher than the oxygen concentration in the PSR reformer under low load. Accordingly, when the reforming reaction is carried out under high load t (partial oxidation rate Zt), the ratio of the partial oxidation reaction can be higher than the ratio of the partial oxidation reaction when the reforming reaction is carried out under low load s (partial oxidation rate Zs). At this time, it is preferable to increase the feed rate of gasoline or a mixed gas of gasoline and steam, since the hydrogen-generating efficiency is reduced.

In contrast, if it is judged that the variation in load P is not larger than the predetermined value Q in Step 102, the routine terminates, because it is not necessary to actively carry out the partial oxidation reaction.

Next, in Step 106, it is decided whether the temperature $t^1$ of the catalyst 12 in the PSR reformer 10 is a predetermined value $T^1$ or higher, and if it is judged that the temperature $t^1$ is higher than the predetermined $T^1$, the quantity of hydrogen is not lowered irrespective of a significantly large variation in load, because the partial oxidation reaction is carried out under the condition of Zs>Zt, significant reduction in the quantity of the heat stored is prevented, and the catalyst temperature is maintained at a higher temperature to some extent. In the next Step 108, it is decided once again whether the variation in load P is still greater than the predetermined value Q, and the routine terminates if the variation in load P is judged to be the predetermined value Q or less.

On the other hand, if the variation in load P is judged to still exceed the predetermined value Q in Step 108, it is decided as to whether the temperature $t^1$ of the catalyst is the predetermined value $T^1$ or higher, returning to Step 106, and the routine proceeds to Step 108 on the condition that the temperature $t^1$ is not lower than the predetermined value $T^1$. If the temperature $t^1$ is judged to be lower than the predetermined value $T^1$, the system is in the state of Zs≦Zt or in a state that even if the condition of Zs>Zt is satisfied it is to an insufficient extent, and it is necessary once again to raise the ratio of the partial oxidation reaction. Accordingly, it is decided whether the temperature $t^1$ of the catalyst is not higher than the predetermined temperature $T^0$ for switching control in Step 107, and, if the temperature $t^1$ is judged to be higher than the temperature $T^0$ for the switching control, the routine returns back to Step 104, because it is not the switching timing for switching from the reforming reaction to the regeneration reaction. Further, the feed rate of the cathode offgas supplied from the injection device 14 is increased in a similar manner to above in Step 104.

If the temperature $t^1$ is judged to be less than the predetermined value $T^1$ in Step 106 after an increase in the air supply, the system is in the condition in which a period of time is required for reaching the predetermined value $T^1$, or in the condition in which the ratio of the partial oxidation reaction is insufficient, and the routine returns to Step 104 on the condition that the catalyst temperature $t^1$ is higher than the temperature $T^0$ of switching control, and the opening of valve V1 is widened and the amount of air (oxidant) supplied to the fuel cell 30 is increased. In this manner, the feed rate of the cathode offgas from the injection device 14 is increased, and the ratio of the partial oxidation reaction, in the reforming reaction is increased, so that the efficiency of heating by combustion can be improved. Thereafter, if the temperature $t^1$ is judged to be not lower than the predetermined value $T^1$ in Step 106, the routine proceeds to Step 108 and the system is controlled as described above.

If the temperature $t^1$ is judged to be not higher than the temperature $T^0$ for switching control in Step 107, the temperature of the catalyst has dropped to a temperature at which the reforming reactivity is insufficient, and thus, it is necessary to switch to the regeneration reaction. Therefore, the PSR reformer 10 is switched from the reforming reaction to the regeneration reaction, and the routine terminates. At this time, the PSR reformer 20 is switched from the regeneration reaction to the reforming reaction. Instead of the switching based on the temperature as described above, the reactions may be switched according to the time when the period of time from the initiation of the reaction (cycle period) exceeds a predetermined switch-controlling period (cycle period>switch-controlling period) in Step 107.

As described above, a significant reduction of the quantity of the stored heat in the PSR reformer 10 can be prevented and the temperature of the catalyst 12 can be maintained by increasing the ratio of the partial oxidation reaction in the reforming reaction, so that the quantity of the hydrogen generated by reforming can be secured even in the transition period and the generation of soot can be avoided owing to increase in an amount of oxygen. Thus, the electric power-generating operation can reliably and continuously be performed.

A switching cycle-controlling routine for controlling the switching cycle between the reforming and combustion reactions in each of the PSR reformers in which the switching cycle under high load becomes shorter than the switching cycle under low load when the fuel cell 30 is changed from the power-generating operation under low load to the power-generating operation under high load (in transition period), will be described below. The switching timing (switching interval) is determined by monitoring the value detected by a temperature sensor attached to each PSR reformer and using the value as a reference value.

The switching cycle-controlling routine is also executed when the fuel cell 30 is changed from the power-generating operation under low load to the power-generating operation under high load before the next switching timing (in transition period).

Figure 6:
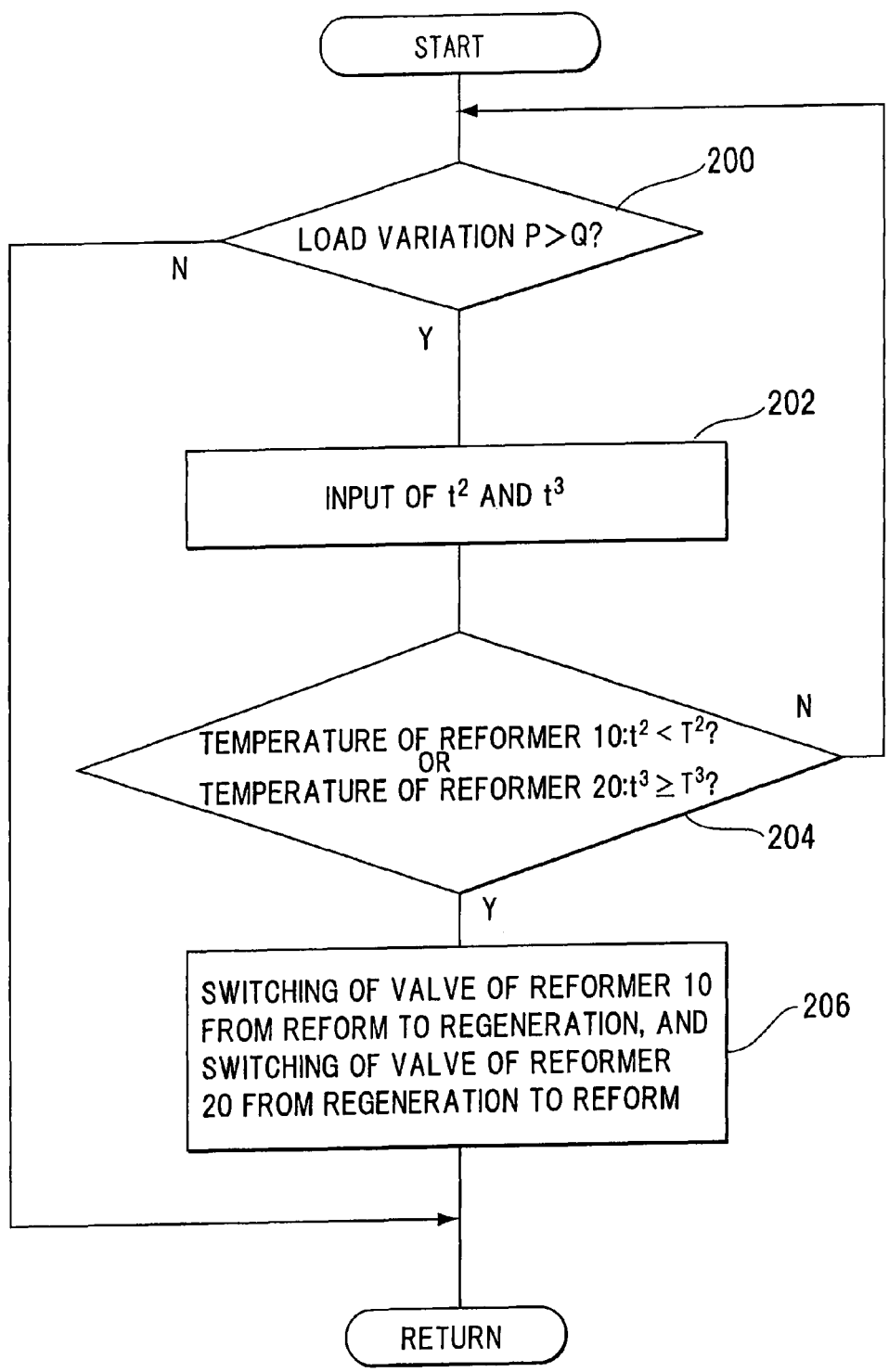
FIG. 6 is a flow chart showing the switching cycle-controlling routine executed in the transition period in the fuel cell system in an embodiment of the present invention.
Figure 7:
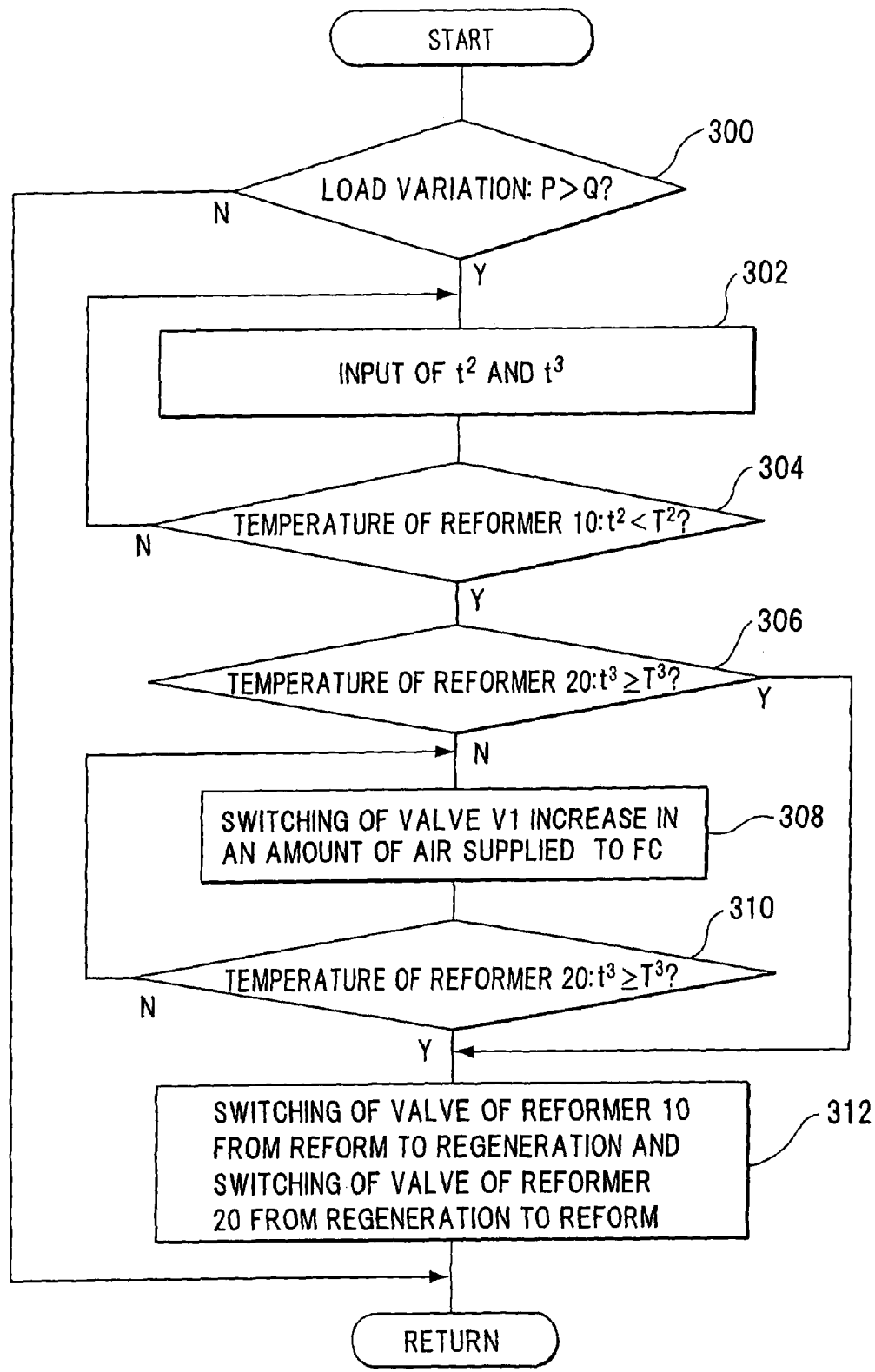
FIG. 7 is a flowchart showing another switching cycle-controlling routine executed in the transition period in the fuel cell system.

FIG. 6 shows a switching cycle-controlling routine in which the cycle between switching the reforming reaction and the regeneration reaction is shortened, when the temperature of the PSR reformer in the reforming reaction is lower than the threshold temperature or the temperature of the PSR reformer in the regeneration reaction is higher than the threshold temperature.

When the routine is executed, it is judged as to whether the variation in load P (=t−s) is higher than the predetermined value Q in Step 200 when the fuel cell system is in the transition period, i.e., when the fuel cell is changed from a state under low load "s" to a state under high load "t", and if the variation in load P exceeds the predetermined value Q, the routine proceeds to Step 202, the temperature $t^2$ of the PSR reformer 10 and the temperature $t^3$ of the PSR reformer 20 are inputted from the temperature sensors, and, if the variation in load P is judged to be not higher than the predetermined value Q, the routine terminates, because the partial oxidation reaction is not required to be actively performed.

In the next Step 204, it is judged as to whether one of the conditions that the temperature $t^2$ of the PSR reformer 10 is lower than the threshold value $T^2$ ($t^2<T^2$) and/or the temperature $t^3$ of the PSR reformer 20 is not lower than the threshold value $T^3$ ($t^3 \geq T^3$) is satisfied, and if one of the conditions is judged to be satisfied, the openings of respective valves are altered to switch the PSR reformer 10 forcibly from the reforming reaction to the regeneration reaction, and to switch the PSR reformer 20 from the regeneration reaction to the reforming reaction in Step 206.

In this manner, the hydrogen quantity can be secured irrespective of the variation in load when the amount of hydrogen required for the fuel cell increases rapidly with transition form the low load state to the high load state, and the continuous stable electric power-generating operation can be obtained.

If both of the conditions of $t^2<T^2$ and $t^3 \geq T^3$ are judged to be unsatisfied in Step 204, since the variation in load P exceeds the predetermined value Q and there is a fear of drastic drop of the efficiency if the hydrogen-generation, the routine is returned to Step 200 to determine again as to whether the variation in load P exceeds the predetermined value Q, and the system is controlled in a similar manner as described above.

Hereinafter, another example of the switching cycle-controlling routine will be described. FIG. 7 shows a switching cycle-controlling routine in which the cycle of switching alternately between the reforming reaction and the regeneration reaction is shortened when the temperature of the PSR reformer, in which the reforming reaction is performed, becomes lower than a threshold temperature before the temperature of the PSR reformer, in which the regeneration reaction is performed, becomes higher than a threshold temperature.

When the routine is executed, it is judged as to whether the variation in load P (=t−s) when the fuel cell system is in the transitional period, i.e., when the fuel cell is shifted to the transitional state from a low load state "s" to a high load state "t", exceeds the predetermined value Q in Step 300, and if the variation in load P is judged to be greater than the predetermined value Q, the temperature $t^2$ of the PSR reformer 10 and the temperature $t^3$ of the PSR reformer 20 are inputted from the temperature sensors in Step 302. If the variation in load P is judged to be not higher than the predetermined value Q, the routine terminates, because it is not necessary to actively perform the partial oxidation reaction.

Next, in Step 304, it is judged as to whether the temperature $t^2$ of the PSR reformer 10 is lower than the threshold value $T^2$ ($t^2<T^2$), if $t^2<T^2$ is satisfied, it is necessary to switch the PSR reformer 10 from the reforming reaction to the regeneration reaction. Therefore, it is judged as to whether the temperature $t^3$ of the PSR reformer 20 is now lower than the threshold value $T^3$ in the next Step 306, and if $t^3 \geq T^3$ is satisfied, in Step 312, the opening or closing state of the respective valves are switched to switch forcibly the PSR reformer 10 from the reforming reaction to the regeneration reaction, and switch the PSR reformer 20 from the regeneration reaction to the reforming reaction, and the routine terminates.

On the other hand, in Step 306, if it is judged that $t^3<T^3$ is satisfied, i.e., that the temperature $t^2$ of the PSR reformer 10, in which the reforming reaction is performed, satisfies the condition of $t^2<T^2$ before the temperature $t^3$ of the PSR reformer 20, in which the regeneration reaction is performed, satisfies the condition of $t^3 \geq T^3$, and the opening degree of the valve V1 is widened to increase an amount of the air (oxidant) supplied to the fuel cell 30 in Step 308.

Thus, it is possible to increase the discharge amount of the cathode offgas and the feed rate of the cathode offgas supplied from the injection device 14 during the period before the condition of $t^3 \geq T^3$ is satisfied, and to increase the oxygen content in the cathode offgas in the state where the variation in load does not take place. Accordingly, the ratio of the partial oxidation reaction by performing the reforming reaction, can be increased in the state under a high load "s" with an excess amount of oxygen as compared with an amount of oxygen under a low load "t", so that the quantity of hydrogen generated by the reforming can be secured and the power-generating operation can be stably preformed continuously even in the transitional period. Thus, it is possible to move rapidly to the steady operation in which the regeneration and reforming reactions are synchronously performed.

Next, in the next Step 310, it is judged once again as to whether the temperature $t^3$ of the PSR reformer 20 satisfies the condition of $t^3 \geq T^3$, and if the condition of $t^3 \geq T^3$ is judged to be satisfied, the reforming reaction can favorably be performed in the PSR reformer 20, so that in Step 312, the degree of the opening of the respective valves is changed to switch the PSR reformer 10 forcibly from the reforming reaction to the regeneration reaction and the PSR reformer 20 from the regeneration reaction to the reforming reaction and the routine terminates.

In Step 310, if it is judged the condition still satisfies $t^3<T^3$, the system is in the condition that a period of time is require to reach the predetermined value $T^3$, or the ratio of the partial oxidation reaction is insufficient. Accordingly, the degree of opening of the valve V1 is widened and the amount of the air supplied to the fuel cell 30 is increased, returning to Step 308. Thereafter, if it is judged that the condition of $t^3 \geq T^3$ is satisfied in Step 310, the degree of opening and closing of the respective valves are changed in a similar manner as described above, and the routine terminates.

In Step 308 above, the feed rate of the air supplied to the fuel cell 30 is increased to facilitate the partial oxidation reaction, but the catalyst also may be heated by a heating device such as an electric heater placed in the vicinity of the catalyst until the condition of $t^3 \geq T^3$ is satisfied. In this case, the quantity of hydrogen can be secured in the transitional period and the power-generating operation can be stably performed continuously. Thus, it is possible to move rapidly to steady operation in which the regeneration reaction and the reforming reaction are synchronously performed.

In Step 304, if it is judged that the condition of $t^2 \geq T^2$ is satisfied, the system is in a state where the variation in load P exceeds the predetermined value Q and there is a fear of drastic drop of the efficiency of the hydrogen-generation, returning to Step 302 both temperatures $t^2$ and $t^3$ are inputted, and the system is controlled in a similar manner in the above.

As described above, the continuation time of the reforming reaction in each of the PSR reformers is shorter than the continuation time of the reforming reaction under low load, so that it is possible to suppress a significant drop in the quantity of the heat stored in each PSR reformer and retain the temperature of the catalyst 12 without deteriorating the reforming reactivity, and thus, the amount of hydrogen generated by reforming can be secured, and the power-generating operation can stably be performed continuously even in the transitional period.

In the switching cycle-controlling routine described above, when the temperature $t^2$ of the PSR reformer in the reforming reaction is lower than the threshold temperature $T^2$, that is when the temperature $t^3$ of the PSR reformer in which the regeneration reaction is performed becomes higher than the threshold temperature $T^3$ before generation of hydrogen by reforming in the reforming reaction becomes insufficient, the feed rate of hydrogen and anode offgas is reduced by controlling the valves V2, V4, and V6, so as not to excessively increase the temperature of the PSR reformer, in which the regeneration is performed, and the increase in the temperature is suppressed by increasing the feed rate of the combustion-assisting air and cathode offgas by controlling the valves V1 and V3.

In the switching cycle-controlling routine in the above, the switching timing (switching interval) is performed by monitoring the temperature of each PSR reformer detected by a temperature sensor, but it may also be performed, for example, by connecting a gas-detecting sensor to an discharge pipe (e.g., discharge pipe 104) mounted to the PSR reformer, in which the reforming reaction is performed, to monitor the gas composition (e.g., hydrogen concentration) in the hydrogen-rich gas, the monitored values being used as reference values for determining the switching timing.

In the transitional period when the fuel cell 30 is changed rapidly from the low load state to the high load state and the amount of hydrogen required by the fuel cell increases, heating of the catalyst by a heating device such as an electric heater is also effective. In such a case, the heater or the like is disposed in the vicinity of the catalyst-holding section 12 of the PSR reformers and the electric heater or the like in the PSR reformer, in which the reforming reaction is performed is turned on, so that the catalyst can be heated directly, to accelerate the reforming reaction significantly, and to shorten the switching cycle between the reforming reaction and the regeneration reactions.

When a heating device such as an electric heater is installed, it is effective to mount the heating device selectively at the section where the temperature is highest in the catalyst-holding sections of the PSR reformer. The reforming reaction proceeds most rapidly in the highest-temperature section (i.e., the reaction rate does not increase linearly with increasing temperature, but the reaction is accelerated rapidly at high temperature), and it is possible to enhance the heat-energy efficiency by suppressing heating to the sections where the reaction-promoting effect is lower, rather than heating the low-reactivity sections or the entirety including the low-reactivity sections to a medium degree.

In the fuel cell system according to the present invention, the fuel cell may be selected according to applications from hydrogen-separation-membrane fuel cells which have an electrolyte film laminated with an electrolytic layer on at least one surface of a dense hydrogen-permeating film (hydrogen-permeable metal layer) using a hydrogen-permeable metal (the cell may be either a proton-conductive solid oxide type or solid polymer type).

Preferred examples thereof include:

(1) a hydrogen-separation-membrane fuel cell including an electrolyte film having a hydrogen-permeable metal and an inorganic electrolyte layer (in particular, proton-conductive ceramic) formed on at least one surface of the metal, a hydrogen electrode formed on one surface of the electrolyte film and a fuel-supplying member for supplying a fuel for power generation to the hydrogen electrode, and an oxygen electrode formed on the other surface of the electrolyte film and an oxidant gas-supplying member for supplying the oxidant gas to the oxygen electrode; and, (2) a solid polymer hydrogen-separation-membrane fuel cell comprising an electrolyte film having a proton-conductive electrolyte layer and hydrogen-permeable metals for sandwiching the electrolyte layer from both sides of the electrolyte layer, a hydrogen electrode formed on one surface of the electrolyte film and a fuel-supplying member for supplying a fuel for power generation to the hydrogen electrode, and an oxygen electrode formed on the other surface of the electrolyte film and an oxidant-supplying member for supplying an oxidant gas to the oxygen electrode.

FIGS. 8 to 9 show other specific examples of the hydrogen-separation-membrane fuel cells used in the fuel cell system according to the present invention. See Japanese Patent Application Laid-Open (JP-A) No. 2004-146337 for details about other typical examples.

FIG. 8 shows a hydrogen-separation-membrane fuel cell 60 comprising an electrolyte film 61 having a five-layered structure including a dense base material 66 of vanadium (V), and an oxygen electrode ($O_2$ electrode) 62 and a hydrogen electrode ($H_2$ electrode) 63 sandwiching the electrolyte film 61 therebetween, additionally with a metal diffusion-preventing layer and a reaction-preventing layer. The electrolyte film 61 has a base material 66, a dense metal diffusion-preventing layer 67 and a palladium (Pd) layer 68 formed in this order on the hydrogen electrode (anode) 63 side surface thereof, a dense reaction-preventing layer (for example, a layer of a proton conductor, mixed conductor, or insulator) 65 and a thin electrolyte layer formed of a solid oxide (for example, a layer of a perovskite metal oxide such as $SrCeO_3$) 64 in this order on the oxygen electrode (cathode) 62 side surface of the base material 66. The reaction-preventing layer 65 has a function of preventing the reaction between oxygen atoms in the electrolyte layer 64 and the base material (V) 66. Air flow channels 59*a* and fuel channels 59*b* are formed between the oxygen or hydrogen electrode, respectively, and the electrolyte film, in a similar manner to above. Details of the metal diffusion-preventing layer and the reaction-preventing layer are the same as those described above.

FIG. 9 shows a solid polymer type hydrogen-separation-membrane fuel cell 70, comprising an electrolyte film 71 having a dense hydrogen-permeable layer formed of a hydrogen-permeable metal, and an oxygen electrode ($O_2$ electrode) 72 and a hydrogen electrode ($H_2$ electrode) 73 for sandwiching the electrolyte film 71 therebetween. The electrolyte film 71 has a multi-layered structure consisting of an electrolyte 76 formed of a solid polymer film such as, for example, NAFION (registered trademark) film, the two surfaces thereof being held between the hydrogen-permeable dense metal layers, with a palladium (Pd) layer (dense layer) 77 formed on the hydrogen electrode (anode) side surface of the electrolyte layer 76, and a layer of a base material vanadium-nickel alloy (V—Ni) layer (dense layer) 75 and a Pd layer (dense layer) 74 on the oxygen electrode (cathode) side surface of the electrolyte layer 76. Air flow channels 59*a* and fuel flow channels 59*b* are formed, respectively, between the oxygen electrode or hydrogen electrode and the electrolyte film 71 in a similar manner to as described above. A metal diffusion-preventing layer may also be formed between the V—Ni layer 75 and the Pd layer 74 in the fuel cell, and a reaction-preventing layer may be formed between the V—Ni layer 75 or Pd layer 77 and the electrolyte layer 76.

In the solid polymer fuel cell as shown in FIG. 9, in which the hydrogen-permeable layers formed of a hydrogen-permeable metal are formed so as to sandwich a water-containing electrolyte layer therebetween, vaporization of water in the electrolyte layer and an increase in film resistance can be prevented at high temperatures and the operative temperature of the solid polymer fuel cells (PEFC), which are generally operable at low temperatures, can be raised to a temperature range of 300 to 600° C. Thus, the cathode offgas discharged from the fuel cell directly can be directly supplied to the PSR reformer, in which the reforming reaction is performed, which is advantageous for the fuel cell system according to the present invention.

A mixed gas of gasoline and steam is used as the reactant to be reformed in the embodiments above, but, similarly, a hydrocarbon fuel other than gasoline may also be used.

INDUSTRIAL APPLICABILITY

The invention provides a hydrogen-generating apparatus in which the reduction in reforming efficiency associated with an increase in switching frequency to the regeneration reaction can be suppressed, and generation of hydrogen by reforming can stably be performed, irrespective of the amount of hydrogen required, and a fuel cell system having a high heat-utilization efficiency that exhibits a stable power-generating performance irrespective of the variation in load.

The invention claimed is:

1. A fuel cell system, comprising:
a hydrogen-generating apparatus including at least two distinct and separate reforming reactors that are not in direct contact with one another, each of the at least two reforming reactors containing a catalyst, at least one of the at least two reforming reactors being configured to carry out a fuel-reforming reaction that utilizes stored heat, and at least one of the at least two reforming reactors being configured to carry out a regeneration reaction that recovers a quantity of the stored heat lowered due to the fuel-reforming reaction, wherein:
the fuel-reforming reaction and the regeneration reaction are alternately switched between the at least two reforming reactors,
a reactant to be reformed is subjected to the reforming reaction on a heated catalyst when the reactant to be reformed is supplied, and
a combustion fuel is subjected to a combustion reaction to heat the catalyst when the combustion fuel is supplied;
a supplying unit comprising a valve connected to a cathode discharge pipe and a first end of each of at least two supply pipes, the at least two supply pipes each being connected to one of the at least two reforming reactors by a second end, wherein the valve switches the supply such that the oxygen-containing gas is supplied to at least one of the at least two reforming reactors in which the reforming reaction is performed; and
a fuel cell containing an electrolyte having an electrolyte layer formed on at least one face of a hydrogen-permeable metal layer and having an operating temperature of from 300° C. to 600° C., the fuel cell being configured to generate electricity by supplying the reformed hydrogen-containing gas generated in the hydrogen-generating apparatus, wherein the supplying unit is configured to supply the oxygen-containing gas by being configured to supply cathode offgas discharged from the fuel cell directly to the at least one reforming reactor in which the fuel-reforming reaction is performed.

2. The fuel cell system according to claim 1, wherein the at least one reforming reactor in which the fuel-reforming reaction is performed is constituted so as to carry out a steam-reforming reaction and a partial oxidation reaction, and the fuel cell system further comprises a reaction-controlling unit for controlling the reactions to make the proportion of the partial oxidation reaction in the reforming reactor greater than that for low load when the fuel cell power load is changed from low to high.

3. The fuel cell system according to claim 1, wherein the fuel cell system further comprises a cooling unit for cooling the fuel cell with a cooling medium, and the cooling medium discharged from the cooling unit is supplied into at least one of the reforming reactors, in which the reforming reaction is performed, together with the cathode offgas.

4. The fuel cell system according to claim 2, wherein the fuel cell further comprises a cooling unit for cooling the fuel cell with a cooling medium, and the cooling medium discharged from the cooling unit is supplied into at least one of the reforming reactors, in which the reforming reaction is performed, together with the cathode offgas.

5. The fuel cell system according to claim 1, further comprising a reaction-controlling unit for controlling the reactions to make the switching cycle between the reforming reaction and the combustion reaction in each of the reforming reactors under high load shorter than that under low load, when the fuel cell power load is changed from low to high.

6. The fuel cell system according to claim 2, further comprising a reaction-controlling unit for controlling the reactions to make the switching cycle between the reforming reaction and the combustion reaction in each of the reforming reactors under high load shorter than that under low load, when the fuel cell power load is changed from low to high.

7. The fuel cell system according to claim 3, further comprising a reaction-controlling unit for controlling the reactions to make the switching cycle between the reforming reaction and the combustion reaction in each of the reforming reactors under high load shorter than that under low load, when the fuel cell power generation is changed from low to high.

8. The fuel cell system according to claim 4, further comprising a reaction-controlling unit of controlling the reactions to make the switching cycle between the reforming reaction and the combustion reaction in each of the reforming reactors under high load shorter than that under low load, when the fuel cell power generation is changed from low to high.

9. The fuel cell system according to claim 1, wherein the electrolyte layer comprises $BaCeO_3$ or $SrCeO_3$.

10. The fuel cell system according to claim 1, wherein the hydrogen-permeable metal layer comprises palladium, vanadium, niobium, tantalum, or an alloy comprising at least one of palladium, vanadium, niobium, or tantalum.

11. The fuel cell system according to claim 1, wherein the electrolyte layer comprises $BaCeO_3$.

* * * * *